United States Patent [19]

Usui et al.

[11] Patent Number: 4,768,987
[45] Date of Patent: Sep. 6, 1988

[54] TOY AUTOMOBILE HAVING A BODY FORMED BY A COMPOSITION FOR WRITING

[75] Inventors: Jiro Usui, Tokyo; Koji Seki; Yosimi Kano, both of Saitama, all of Japan

[73] Assignee: Buncho Corporation, Tokyo, Japan

[21] Appl. No.: 54,884

[22] Filed: May 27, 1987

[30] Foreign Application Priority Data

Jun. 30, 1986 [JP] Japan .......................... 61-100476[U]

[51] Int. Cl.⁴ ..................... A63H 17/00; B43K 25/00; C09D 13/00
[52] U.S. Cl. ...................................... 446/71; 446/146; 446/431; 446/470; 401/52; 106/19; 523/164; 524/582; 524/585
[58] Field of Search ................ 446/71, 431, 465, 470, 446/457, 146, 491, 464, 462; 401/52, 49, 88; 106/19, 20; 523/164; 524/277, 294, 301, 582, 585

[56] References Cited

U.S. PATENT DOCUMENTS

| | | | |
|---|---|---|---|
| D. 284,980 | 8/1986 | Yoshida | D19/41 |
| 2,391,392 | 12/1945 | Coffin | 401/52 |
| 3,702,314 | 11/1972 | Farson et al. | 523/164 |
| 3,933,708 | 1/1976 | Brinkman | 523/164 |
| 4,156,986 | 6/1979 | Kupperman et al. | 446/470 X |
| 4,212,786 | 7/1980 | Murakami | 523/164 |
| 4,468,146 | 8/1984 | Tabachnik | 401/88 |

FOREIGN PATENT DOCUMENTS 2049429 3/1971 France.

*Primary Examiner*—Mickey Yu
*Attorney, Agent, or Firm*—Burns, Doane, Swecker & Mathis

[57] ABSTRACT

A toy automobile equipped with a running device, has a body which can be used to write characters and pictures on paper.

The body of the toy automobile is formed of a composition for writing which contains 25 to 80% by weight of polyolefin, 5 to 60% by weight of wax and the balance of a coloring agent.

16 Claims, 1 Drawing Sheet

TOY AUTOMOBILE HAVING A BODY FORMED BY A COMPOSITION FOR WRITING

BACKGROUND OF THE INVENTION

1. Field of the Invention

The present invention relates to a toy automobile having a running device.

2. Prior Art

Various types of toy automobiles have come onto the market. This is because toy automobiles fascinate not only children but also adults. A variety of toy automobiles have therefore been put on the market so as to meet a variety of demands. Such toy automobiles include miniatures of both classic cars and well-known motorcars presently available on world markets, as well as those provided with various functions for fascinating their users. The last type of toy automobiles can be classified into those having an automatic running device, such as Choro Q (a registered trademark), remote-controlled cars, those that can be disassembled and assembled, and those that can be transformed into a robot or a rocket. Further, toy automobiles having new functions are under development.

SUMMARY OF THE INVENTION

The present invention is based on the discovery that if the body of a toy automobile is formed of a composition for writing on paper, in place of a commonly used metal or an ordinary plastic, the resulting toy automobile not only has the characteristics required for a toy automobile, including strength, but also exhibits a new and excellent function: letters or pictures can be written on paper with the toy automobile itself.

It is therefore a main object of the present invention to provide a toy automobile which has a new and novel function.

Another object of the present invention is to provide a toy automobile with a body which can be used to write characters and pictures on paper. These and other objects of the present invention will be clear from the following description.

In accordance with the present invention, there is provided a toy automobile comprising a body formed of a composition for writing which contains a polyolefin, and a running device.

DESCRIPTION OF THE PREFERRED EMBODIMENT

Figure 1:
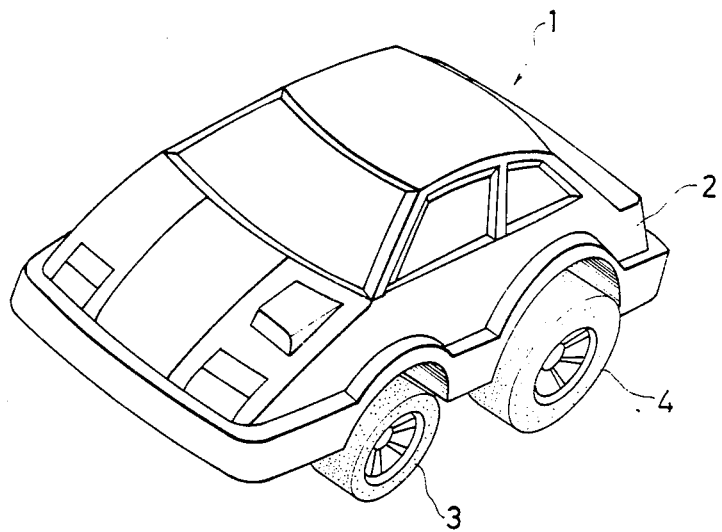
FIG. 1 is a perspective view of a toy automobile of the present invention.

The writing composition that is employed in the present invention may be a polyolefin containing a wax, a lubricant and a coloring agent. Practically, the writing composition contains 25 to 80 weight % (hereinafter all weight percentages age referred to merely as %), or preferably, 35 to 70%, of a polyolefin, such as polyethylene or polypropylene, 5 to 60%, or preferably, 15 to 50%, of a wax, the coloring agent occupying the remaining percentage.

The composition can also contain 5 to 15% of a lubricant. The polyethylene or plypropylene employed as a component may be one having a melt-flow rate (hereinafter referred to as MFR) of between 4 and 55 g/10 min, preferably, one having a density of 0.94 g/cm$^3$ or less. With the above-described polyolefin employed in the range described above, it is possible to provide the body of the resulting toy automobile with both strength and flexibility. The wax employed as a component may be a natural wax, such as carnauba wax, Japan wax, montan wax, paraffin wax or microcrystalline wax, or a synthetic wax such as a fatty acid (such as oleic acid or stearic acid), its salt (such as calcium oleate, calcium stearate, magnesium oleate, magnesium stearate, aluminium oleate, aluminium stearate) a fatty acid amide a ketone wax (such as distearyl ketone) or a polyethylene wax.

Any coloring agent that is employed in crayon, pastel or pencil compositions can be employed. However, preferable coloring agents include an inorganic pigment, such as titanium dioxide, black iron oxide, yellow iron oxide, red iron oxide, ultramarine, prussian blue, zinc white, alumina white, carbon black, aluminum powder, bronze powder or mica. Organic pigments preferably employed include: a nitroso or a nitro pigment, such as Naphthol Green or Naphthol Yellow; an azolake pigment, such as Lithol Red, Lake Red C, Brilliant Carmine 6B, Watchung Red or Bordeaux 10B; an insoluble azo pigment, such as Fast Yellow, Disazo Yellow, Pyrazolone Orange, Para Red, Lake Red 4R or Naphthol Red; a condensed azo pigment, such as Chromophthal Yellow or Chromophthal Red; a dyed lake pigment, such as Peacock Blue Lake, Alkali Blue Lake, Rhodamine Lake, Methyl Violet Lake or Malachite Green Lake; a phthalocyanine pigment, such as Phthalocyanine Blue, Fast Sky Blue or Phthalocyanine Green; a threne pigment, such as Anthrapyrimidine Yellow, Perynon Orange, Perylene Red, Thioindigo Red, or Indanthrone Blue; a quinacridone pigment, such as Quinacridone Red or Quinacridone Violet; a dioxazine pigment, such as Dioxazine Violet; an isoindolenone pigment, such as Isoindolenone Yellow; and a fluorescent pigment. If the inorganic pigment is employed as a coloring agent, it may be added in an amount of between 5 and 40%, more preferably, between 10 and 25%. In the case of an organic pigment, the amount added may be between 1 and 15%, more preferably, between 2 and 10%. With the wax and the coloring agent employed in the above-described amounts, the resulting toy automobile is capable of exhibiting adequate writing characteristics. In addition, 30% or less of an extender pigment, such as talc, kaolin clay, calcium carbonate or magnesium silicate, may also be added as a bulking agent. If the amount of extender pigment added exceeds 30%, the writing characteristics will be impaired.

The above-described composition may be formed into any shape that enables it to be employed as a toy automobile body by a known molding method, for example, by injection molding method, according to the present invention. At this time, the wall thickness of the body may be set at between 2 and 30 mm, more preferably, between 3 and 15 mm. The body may be provided with at least one corner which can conveniently be used for writing. If the wall thickness exceeds the above-described range, the body may be easily deformed owing to shrinkage of the wax or polyolefin.

The body of the toy automobile of the present invention is equipped with a running device. The running device may consist of wheels alone, a part incorporating front and rear wheels, or an automatic running device such as that employed in Choro Q (a registered trademark). Any of these running devices may be mounted directly on the bottom of the body or with the aid of an auxiliary part.

The present invention will be described in detail below by referring to the accompanying drawings.

Figure 2:
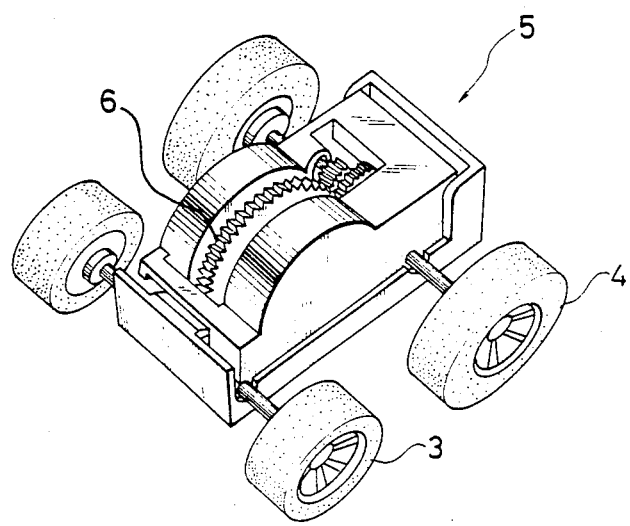
FIG. 2 is an enlarged perspective view of a running device of FIG. 1 in the state of being removed from a body.

FIG. 1 is a perspective view of a toy automobile 1 of the present invention. The toy automobile 1 comprises a body 2 formed of a writing composition containing a polyolefin, and wheels 3, 4 mounted on the bottom of the body 2 and serving as a running device. FIG. 2 is an enlarged perspective view of a running device 5 removed from the body. The wheels 4 are connected to a spring which serves to automatically drive the wheels.

The toy automobile of the present invention is basically constructed in the above-described manner. However, the body may have a single color or many colors. It may also be provided with known automobile parts such as lights or mirrors.

The toy automobile of the present invention is sufficiently strong and runs well, and can therefore satisfy users when employed as a toy. Moreover, it offers a novel form of entertainment: the body can be used for writing letters or drawing pictures on a sheet of paper.

In consequence, if toy automobiles of various colors, including red, blue, yellow, green and so on, are provided to make a set, they may be used as a set of colored pencils. They can also advantageously help infants learn how to write letters or draw pictures while they are playing with them, since they will still function as a toy motorcar.

The present invention will now be described by the non-limitative examples.

EXAMPLE 1

The following components were kneaded with a kneader (at a temperature of 120° C. for an hour), pressed, cooled and then ground, and the resulting material was injection molded into a toy automobile body (white) such as that shown in FIG. 1.

| | |
|---|---|
| Low-density polyethylene (MFR: 45 g/10 min, density: 0.918 g/cm$^3$) | 50% |
| Paraffin (m.p.: 55 to 58° C.) | 10% |
| Calcium carbonate | 3% |
| Oleic acid | 12% |
| Titanium dioxide | 25% |

An automatic running device such as that shown in FIG. 2 was mounted on the bottom of this body. The thus-obtained automobile ran very well. When the toy automobile was dropped from a height of 8 m onto a concrete floor, it did not break at all. Moreover, white letters could be written easily on a sheet of red origami paper with the toy automobile.

EXAMPLE 2

A toy automobile body (red) was obtained in the same manner as in Example 1 with the exception that the following composition was employed in place of that of Example 1.

| | |
|---|---|
| Low-density PE (MFR: 20 g/10 min, density: 0.918 g/cm$^3$) | 30% |
| Polyethylene wax (m.p.: 105 to 115° C.) | 15% |
| Paraffin (m.p.: 55 to 58° C.) | 18% |
| Stearic acid amide | 12% |

| -continued | |
|---|---|
| Calcium stearate | 4% |
| Lanolin | 8% |
| Brilliant Carmine 6B | 8% |
| Magnesium carbonate | 5% |

A running device as shown in FIG. 2 was mounted on this body. The thus-obtained toy automobile ran well, and was sufficiently strong. Red letters could be easily written with it on a sheet of drawing paper.

EXAMPLE 3

A toy automobile body (green) was obtained in the same manner as in Example 1 with the exception that the following composition was employed in place of that of Example 1.

| | |
|---|---|
| Low-density polyethylene (MFR: 50, density: 0.928 g/cm$^3$) | 40% |
| Paraffin (m.p.: 55 to 58° C.) | 12% |
| Hardened oil (m.p.: 53 to 56° C.) | 5% |
| Distearyl ketone | 10% |
| Zinc stearate | 10% |
| Ethylene-vinyl acrylate | 3% |
| Talc | 5% |
| Lubricant | 8% |
| Phthalocyanine Green | 7% |

A running device such as that shown in FIG. 2 was mounted on this body. The thus-obtained toy automobile ran well, and was sufficiently strong. It also could be used to write green letters on a sheet of drawing paper.

What is claimed is:

1. A toy automobile comprising a body formed of a composition for writing which contains a polyolefin, and a running device.

2. A toy automobile as set forth in claim 1 wherein the polyolefin is polyethylene or polypropylene.

3. A toy automobile as set forth in claim 1 wherein the polyolefin has a melt-flow rate of between 4 and 55 g/10 minutes.

4. A toy automobile as set forth in claim 1 wherein the polyolefin has a density of not more than 0.94 g/cm$^3$.

5. A toy automobile as set forth in claim 1 wherein the composition contains 25 to 85% by weight of polyolefin, 5 to 60% by weight of wax and balance of a coloring agent.

6. A toy automobile as set forth in claim 5 wherein the composition contains 35 to 70% by weight of the polyolefin, 15 to 50% by weight of a wax and balance of a coloring agent.

7. A toy automobile as set forth in claim 5 wherein the wax is a natural wax or a synthetic wax.

8. A toy automobile as set forth in claim 5 wherein the wax is a natural wax and is selected from carnauba wax, Japan wax, paraffin wax and microcrystalline wax.

9. A toy automobile as set forth in claim 5 wherein the wax is a synthetic wax and is selected from a fatty acid, it's salt, an amide, ketone wax and polyethylene wax.

10. A toy automobile as set forth in claim 5 wherein the coloring agent is a coloring agent which can be employed in crayon, pastel or pencil compositions.

11. A toy automobile as set forth in claim 5 wherein the coloring agent is an inoganic pigment and the composition contains 5 to 40% by weight of the inorganic pigment.

12. A toy automobile as set forth in claim 5 wherein the coloring agent is an organic pigment and the composition contains 1 to 15% by weight of the organic pigment.

13. A toy automobile as set forth in claim 1 wherein the composition further contains an extender pigment in an amount of not more than 30% by weight.

14. A toy automobile as set forth in claim 1 wherein the composition further contains a lubricant in amount of 5 to 15% by weight.

15. A toy automobile as set forth in claim 1 wherein a wall thickness of the body is between 2 and 30 mm.

16. A toy automobile as set forth in claim 1 wherein the running device is wheels alone, a part incorporating front and rear wheels or an automatic running device.

* * * * *